US010720673B2

(12) United States Patent
Torita et al.

(10) Patent No.: US 10,720,673 B2
(45) Date of Patent: Jul. 21, 2020

(54) NON-AQUEOUS ELECTROLYTE SECONDARY BATTERY

(71) Applicant: Toyota Jidosha Kabushiki Kaisha, Toyota-shi, Aichi-ken (JP)

(72) Inventors: Koji Torita, Nagoya (JP); Keiichi Takahashi, Nishinomiya (JP); Yusuke Fukumoto, Toyonaka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 84 days.

(21) Appl. No.: 16/167,959

(22) Filed: Oct. 23, 2018

(65) Prior Publication Data

US 2019/0123395 A1    Apr. 25, 2019

(30) Foreign Application Priority Data

Oct. 24, 2017    (JP) .................. 2017-205021

(51) Int. Cl.
*H01M 10/42*    (2006.01)
*H01M 10/0525*    (2010.01)
(Continued)

(52) U.S. Cl.
CPC ....... *H01M 10/4235* (2013.01); *H01M 4/131* (2013.01); *H01M 4/366* (2013.01);
(Continued)

(58) Field of Classification Search
CPC ......... H01M 10/4235; H01M 10/0525; H01M 4/131; H01M 4/366; H01M 4/505; H01M 4/628; H01M 4/667; H01M 10/052; H01M 10/054; H01M 2004/028; H01M 4/13; H01M 4/525; H01M 4/62
See application file for complete search history.

(56) References Cited

U.S. PATENT DOCUMENTS

| | | | |
|---|---|---|---|
| 2011/0052985 A1* | 3/2011 | Kashiwazaki | ......... H01G 11/38 |
| | | | 429/217 |
| 2014/0234708 A1* | 8/2014 | Park | ...................... H01M 4/134 |
| | | | 429/211 |

(Continued)

FOREIGN PATENT DOCUMENTS

| | | | |
|---|---|---|---|
| CN | 106099041 A | * | 11/2016 |
| JP | 2016-072221 A | | 5/2016 |
| KR | 20170091425 A | * | 8/2017 |

*Primary Examiner* — Basia A Ridley
*Assistant Examiner* — Heng M. Chan
(74) *Attorney, Agent, or Firm* — Dinsmore & Shohl LLP (57) ABSTRACT

A non-aqueous electrolyte secondary battery includes at least an electrode composite material layer, an intermediate layer, and an electrode current collector. The intermediate layer is arranged between the electrode composite material layer and the electrode current collector. The intermediate layer contains at least a foaming filler, a resin, and a conductive material. A value calculated by dividing an amount (mass %) of the foaming filler by an amount (mass %) of the resin is not smaller than 1.1 and not greater than 2.8 and a value calculated by dividing an amount (mass %) of the foaming filler by an amount (mass %) of the conductive material is not smaller than 8 and not greater than 14. The intermediate layer has a thickness not smaller than 2 μm and not greater than 7 μm.

6 Claims, 4 Drawing Sheets

(51) Int. Cl.
  *H01M 4/36*    (2006.01)
  *H01M 4/02*    (2006.01)
  *H01M 4/131*   (2010.01)
  *H01M 4/62*    (2006.01)
  *H01M 4/66*    (2006.01)
  *H01M 4/505*   (2010.01)
  *H01M 4/525*   (2010.01)

(52) U.S. Cl.
  CPC ........... *H01M 4/628* (2013.01); *H01M 4/667* (2013.01); *H01M 10/0525* (2013.01); *H01M 4/505* (2013.01); *H01M 4/525* (2013.01); *H01M 2004/028* (2013.01)

(56) References Cited

U.S. PATENT DOCUMENTS

| | | | |
|---|---|---|---|
| 2015/0188143 A1* | 7/2015 | Shiozaki | H01M 4/628 429/215 |
| 2016/0093922 A1 | 3/2016 | Endo et al. | |

* cited by examiner

NON-AQUEOUS ELECTROLYTE SECONDARY BATTERY

CROSS-REFERENCE TO RELATED APPLICATIONS

This nonprovisional application claims priority to Japanese Patent Application No. 2017-205021 filed with the Japan Patent Office on Oct. 24, 2017, the entire contents of which are hereby incorporated by reference.

BACKGROUND

Field

The present disclosure relates to a non-aqueous electrolyte secondary battery.

Description of the Background Art

Japanese Patent Laying-Open No. 2016-072221 discloses formation of an intermediate layer between an electrode composite material layer and an electrode current collector. The "electrode composite material layer" herein is a collective denotation of a positive electrode composite material layer and a negative electrode composite material layer and may mean a positive electrode composite material layer, a negative electrode composite material layer, or both of the positive electrode composite material layer and the negative electrode composite material layer. The "electrode current collector" herein is a collective denotation of a positive electrode current collector and a negative electrode current collector and may mean a positive electrode current collector, a negative electrode current collector, or both of the positive electrode current collector and the negative electrode current collector.

SUMMARY

As described above, it has been studied to form an intermediate layer between an electrode composite material layer and an electrode current collector. For example, an intermediate layer containing insulating particles and conductive particles may be formed. For example, ceramic particles can be adopted as the insulating particles. For example, carbon black can be adopted as the conductive particles. The intermediate layer containing the insulating particles and the conductive particles is expected to achieve a function to suppress increase in temperature of a battery on the occurrence of internal short-circuiting.

The insulating particles contained in the intermediate layer in Japanese Patent Laying-Open No. 2016-072221 are mainly composed, for example, of an inorganic compound such as aluminum nitride. An intermediate layer containing such insulating particles tends to be brittle and weak against impact at the time of nail penetration. Therefore, it may be necessary to adjust a thickness of the intermediate layer to an appropriate thickness. When the intermediate layer is small in thickness, the electrode current collector can be exposed in the electrode composite material layer, for example, at the time of nail penetration. In such a case, short-circuiting at a low resistance may occur and thermal runaway of a battery may occur. In addition, when the intermediate layer is small in thickness, a resistance value of the intermediate layer cannot sufficiently be large (that is, a resistance value of an electrode cannot sufficiently be large), it requires time for the electrode current collector (a core of the electrode) to melt on the occurrence of short-circuiting due to nail penetration, and short-circuiting can continue for a long period of time. Therefore, the battery generates much heat and safety may be insufficient. When the intermediate layer is large in thickness, an electrode plate with a high energy density may not be obtained.

An object of the present disclosure is to provide a non-aqueous electrolyte secondary battery in which increase in temperature thereof at the time of nail penetration is suppressed.

Technical features and functions and effects of the present disclosure will be described below. A functional mechanism of the present disclosure, however, includes presumption. The scope of claims should not be limited by whether or not the functional mechanism is correct.

[1] A non-aqueous electrolyte secondary battery includes at least an intermediate layer and an electrode current collector. The intermediate layer is arranged between an electrode composite material layer and the electrode current collector. The intermediate layer contains at least a foaming filler, a resin, and a conductive material. A value calculated by dividing an amount (mass %) of the foaming filler by an amount of the resin is not smaller than 1.1 and not greater than 2.8. A value calculated by dividing an amount (mass %) of the foaming filler by an amount (mass %) of the conductive material is not smaller than 8 and not greater than 14. The intermediate layer has a thickness not smaller than 2 μm and not greater than 7 μm.

Figure 1:
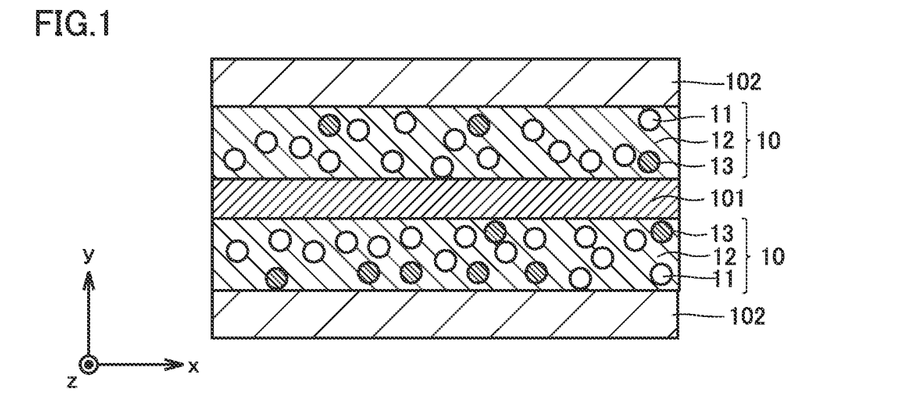
FIG. 1 is a first conceptual cross-sectional view for illustrating a functional mechanism of the present disclosure.

FIG. 1 is a first conceptual cross-sectional view for illustrating a functional mechanism of the present disclosure.

FIG. 1 shows a cross-section in a direction of thickness of a part of a positive electrode. FIG. 1 shows an intermediate layer 10. A battery 1000 includes at least a positive electrode composite material layer 102 (an electrode composite material layer), intermediate layer 10, and a positive electrode current collector 101 (an electrode current collector). Intermediate layer 10 is arranged between positive electrode composite material layer 102 and positive electrode current collector 101. Intermediate layer 10 contains at least a foaming filler 11, a resin 12, and a conductive material 13. The "foaming filler" herein means a filler which expands in volume and emits gas as a result of heating. Though FIG. 1 shows an example in which intermediate layer 10 is arranged between positive electrode composite material layer 102 and positive electrode current collector 101, intermediate layer 10 may be arranged between a negative electrode composite material layer 202 and a negative electrode current collector 201.

Figure 2:
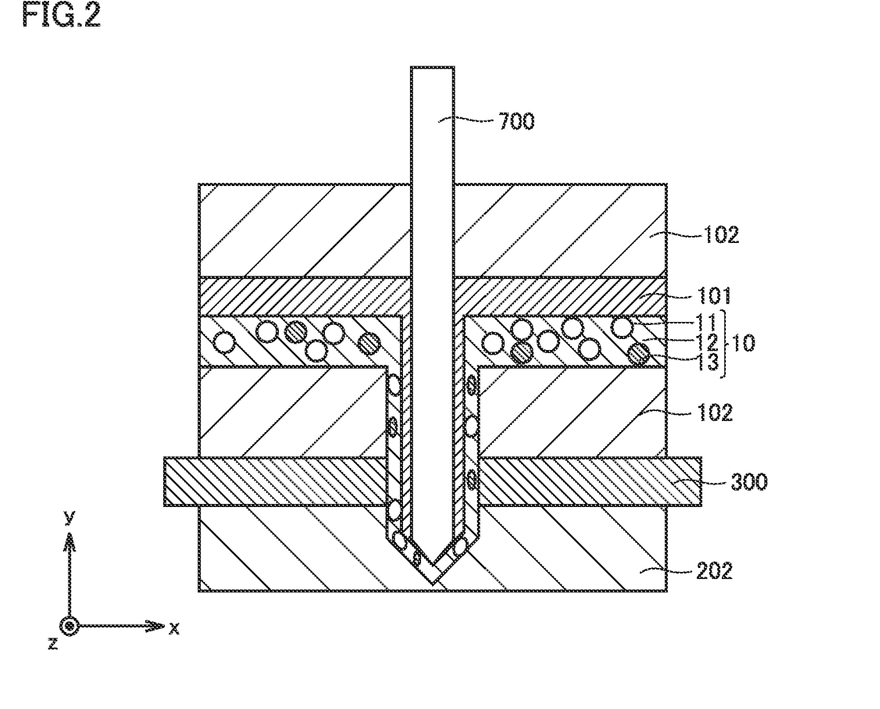
FIG. 2 is a second conceptual cross-sectional view for illustrating the functional mechanism of the present disclosure.

FIG. 2 is a second conceptual cross-sectional view for illustrating the functional mechanism of the present disclosure.

FIG. 2 shows a part of a non-aqueous electrolyte secondary battery (which is also simply denoted as a "battery" below) on the occurrence of nail penetration. In FIG. 2, intermediate layer 10 is formed on one of surfaces of positive electrode current collector 101.

In general, when nail penetration occurs, a positive electrode and a negative electrode are short-circuited at a low resistance through the nail which is a low resistance element, and high Joule heat is generated. Such Joule heat melts a separator around the nail, the positive and negative electrode composite material layers are in contact with each other, a higher short-circuiting current continues to flow, and heat is generated, which leads to thermal runaway. In addition to short-circuiting through the nail, when the positive electrode (negative electrode) current collector comes in direct contact with the negative electrode (positive electrode) composite material layer, short-circuiting at a low resistance occurs, which leads to thermal runaway. Joule heat refers to heat generated when a current flows to a resistive conductor (for example, an electrode), and a quantity of heat is in proportion to a product of a square of a current which flows, a resistance of the conductor, and a duration of flow of the current. Namely, as a resistance of the conductor is higher, Joule heat is also higher.

As shown in FIG. 2, when a nail 700 penetrates battery 1000 according to the present disclosure, phenomena (1) to (4) below will occur. As a result of interaction among these phenomena, suppression of increase in temperature of the battery at the time of nail penetration is expected.

(1) As nail 700 penetrates battery 1000, short-circuiting occurs in part and a temperature locally increases owing to Joule heat in battery 1000 (for example, by not less than 400° C. and less than 800° C.).

(2) As a result of local increase in temperature in the battery, foaming filler 11 foams and emits inert gas (for example, diphosphorus pentoxide or nitrogen). It is considered that such gas is taken into a resin layer 12 and contribute to improvement in stretchability of resin 12. Foaming filler 11 is considered to remain as an inorganic filler in intermediate layer 10 also after foaming and to contribute to insulation of a positive electrode 100.

(3) It is expected that, owing to resin 12 improved in stretchability, intermediate layer 10 continues to exist around nail 700 while it firmly adheres to positive electrode current collector 101 as shown in FIG. 2. It is thus expected that short-circuiting between positive electrode 100 and a negative electrode 200 at a low resistance is prevented. It is expected that a separator 300 melts and positive electrode current collector 101 is less likely to be in direct contact with negative electrode composite material layer 202.

(4) It is considered that, even though resin 12 continues to exist around nail 700 as shown in FIG. 2, short-circuiting occurs in a part in battery 1000. Positive electrode 100 according to the present disclosure includes intermediate layer 10 containing foaming filler 11. Therefore, a resistance of positive electrode 100 is considered as high. Therefore, Joule heat generated due to short-circuiting in positive electrode 100 is considered as high. It is considered that, since generated Joule heat is high, positive electrode current collector 101 is molten in a short period of time and short-circuiting ends in a short period of time. It is thus expected that a total quantity of heat generation by battery 1000 is reduced (that is, increase in temperature of the battery is suppressed).

[2] A decomposition start temperature of the foaming filler may be not lower than 280° C. and a decomposition end temperature thereof may be not lower than 800° C. It is considered that, when such foaming filler 11 is used, foaming filler 11 which has emitted gas by foaming remains in intermediate layer 10 as an inorganic filler and contributes to insulation of positive electrode 100 while stretchability of resin 12 is improved at the time of nail penetration. Therefore, it is expected that suppression of increase in temperature of the battery at the time of nail penetration is noticeably achieved.

[3] The foaming filler may be at least one selected from the group consisting of aluminum phosphate, ammonium polyphosphate, and melamine polyphosphate. It is expected that, when such a foaming filler is employed, stretchability of resin 12 is improved by emitted gas and suppression of increase in temperature of the battery at the time of nail penetration is noticeably achieved.

[4] The resin may be at least one selected from the group consisting of polyamide-imide, polytetrafluoroethylene, and polyamide. It is expected that, since these resins are excellent in stretchability, suppression of increase in temperature of the battery at the time of nail penetration is noticeably achieved.

[5] The intermediate layer may further contain at least one filler selected from the group consisting of alumina, boehmite, titania, lithium titanate, and lithium nickel cobalt manganese oxide (NCM). It is expected that suppression of increase in temperature of the battery at the time of nail penetration is noticeably achieved by further containing such a filler.

[6] The intermediate layer has a thickness not smaller than 2 μm and not greater than 6 μm. It is expected that, by setting a thickness of the intermediate layer to such a value, increase in resistance of the battery can also be suppressed in addition to suppression of increase in temperature of the battery at the time of nail penetration.

The foregoing and other objects, features, aspects and advantages of the present disclosure will become more apparent from the following detailed description of the present disclosure when taken in conjunction with the accompanying drawings.

DESCRIPTION OF THE EMBODIMENTS

An embodiment of the present disclosure (which is herein denoted as the "present embodiment") will be described below. The description below, however, does not limit the scope of claims.

A lithium ion secondary battery will be described below by way of example. The non-aqueous electrolyte secondary battery in the present embodiment should not be limited to the lithium ion secondary battery. The non-aqueous electrolyte secondary battery in the present embodiment may be, for example, a sodium ion secondary battery.

An embodiment in which intermediate layer 10 is arranged between positive electrode composite material layer 102 and positive electrode current collector 101 is described below by way of example of a non-aqueous electrolyte secondary battery. The present embodiment includes also an embodiment in which intermediate layer 10 is arranged between negative electrode composite material layer 202 and negative electrode current collector 201. Namely, the intermediate layer in the present embodiment is arranged between an electrode composite material layer and an electrode current collector.

<Non-Aqueous Electrolyte Secondary Battery>

Figure 3:
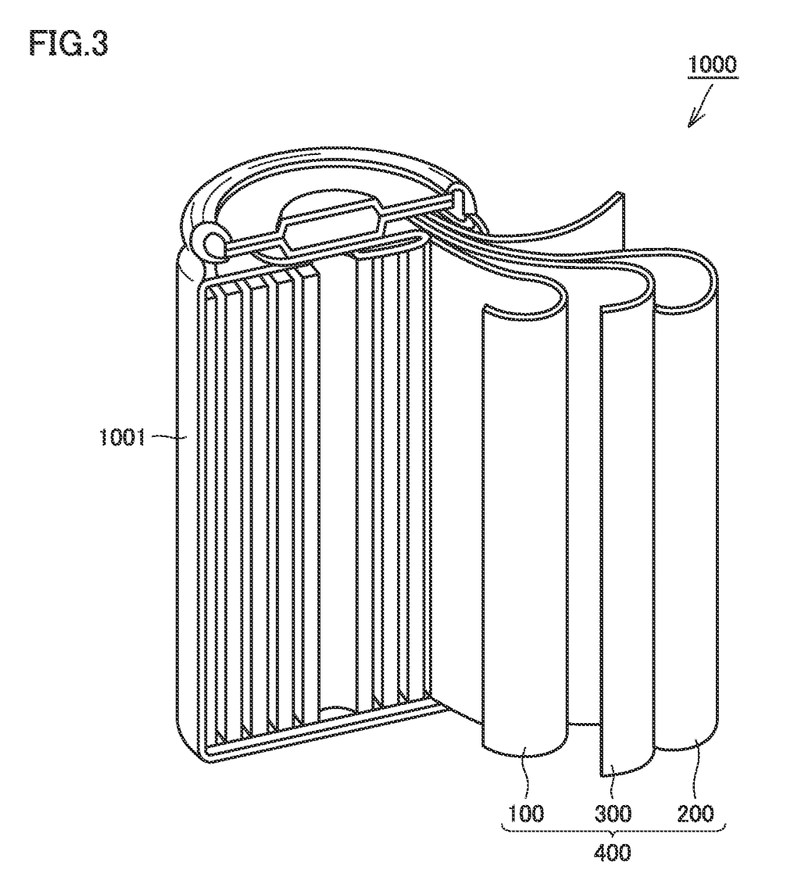
FIG. 3 is a schematic diagram showing one example of a construction of a non-aqueous electrolyte secondary battery in the present embodiment.

FIG. 3 is a schematic diagram showing one example of a construction of a non-aqueous electrolyte secondary battery in the present embodiment.

An outer geometry of battery 1000 is cylindrical. Namely, battery 1000 is a cylindrical battery. The battery in the present embodiment, however, should not be limited to the cylindrical battery. The battery in the present embodiment may be, for example, a prismatic battery.

<<Housing>>

Battery 1000 includes a housing 1001. Housing 1001 is hermetically sealed. Housing 1001 can be made, for example, of an aluminum (Al) alloy. So long as housing 1001 can hermetically be sealed, the housing may be a pouch made of an Al laminated film. Namely, the battery in the present embodiment may be a laminate-type battery. Housing 1001 may further be provided, for example, with a current interrupt device (CID), a liquid introduction port, and a gas exhaust valve (none of which is shown).

<<Electrode Group>>

Figure 4:
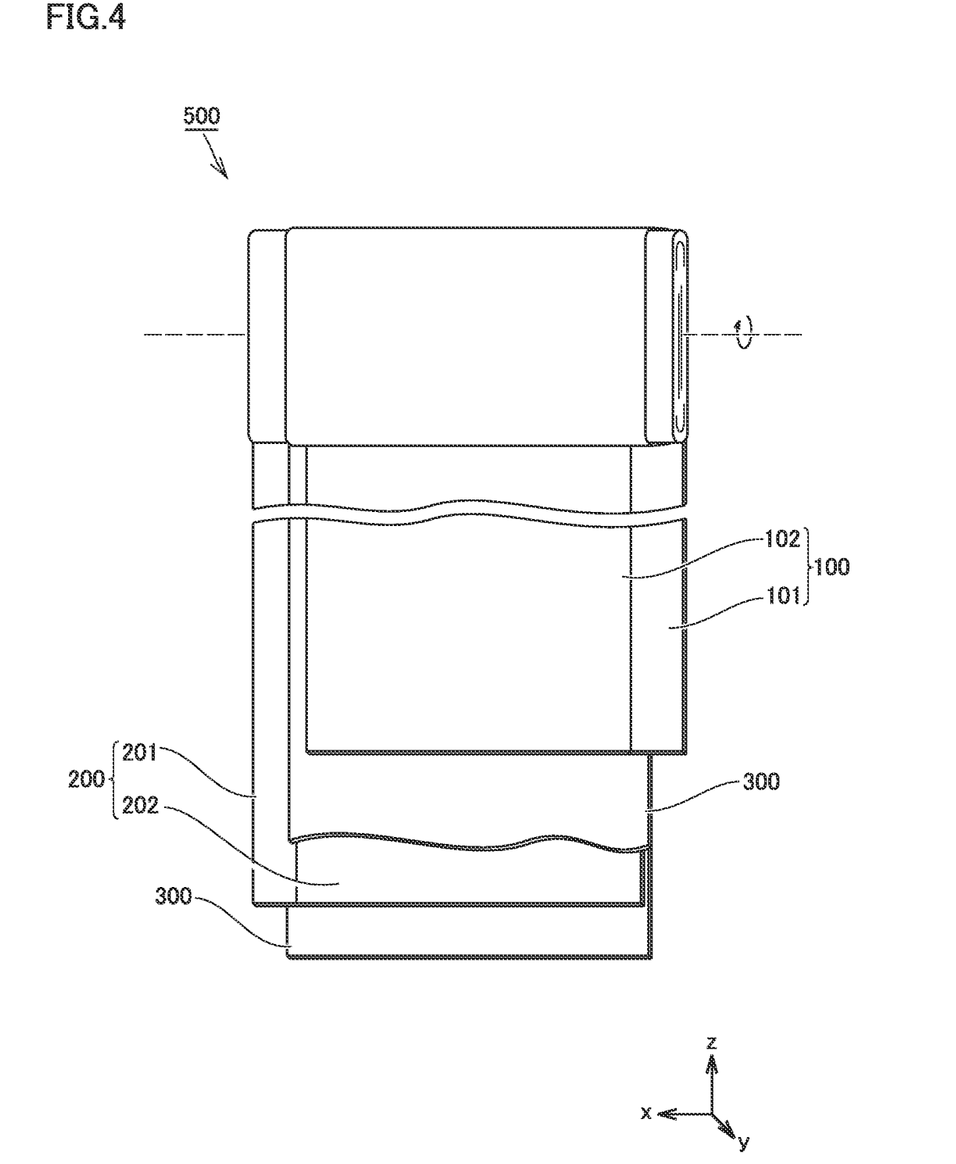
FIG. 4 is a schematic diagram showing one example of a construction of an electrode group in the present embodiment.

FIG. 4 is a schematic diagram showing one example of a construction of an electrode group in the present embodiment.

An electrode group 500 is of a wound type. Electrode group 500 is formed by stacking positive electrode 100, separator 300, negative electrode 200, and separator 300 in this order and further spirally winding the same. The electrode group in the present embodiment should not be limited to the wound type. The electrode group in the present embodiment may be of a stack (layered) type. The electrode group of the stack type can be formed, for example, by alternately stacking positive electrode 100 and negative electrode 200 with separator 300 lying between positive electrode 100 and negative electrode 200.

<<Positive Electrode>>

Figure 5:
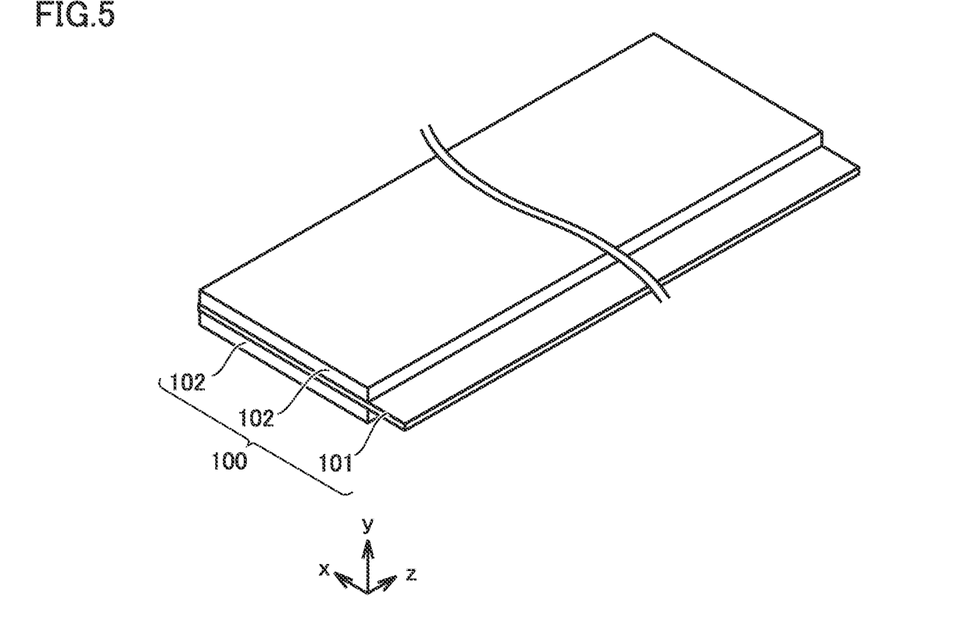
FIG. 5 is a schematic diagram showing one example of a construction of a positive electrode in the present embodiment.

FIG. 5 is a schematic diagram showing one example of a construction of the positive electrode in the present embodiment.

Battery 1000 includes at least positive electrode 100 (electrode). Positive electrode 100 is a sheet in a form of a band. Positive electrode 100 includes positive electrode composite material layer 102 and positive electrode current collector 101. Though not shown in FIG. 5, intermediate layer 10 (FIG. 1) is arranged between positive electrode composite material layer 102 and positive electrode current collector 101. Namely, battery 1000 includes at least positive electrode composite material layer 102 (electrode composite material layer), intermediate layer 10, and positive electrode current collector 101 (electrode current collector).

Positive electrode 100 may have a resistance value, for example, not lower than 200 Ω·cm and not higher than 350 Ω·cm and a resistance value not lower than 202 Ω·cm and not higher than 327 Ω·cm. By setting a resistance value of positive electrode 100 to such a value, Joule heat generated due to short-circuiting in positive electrode 100 when short-circuiting between the positive electrode and the negative electrode occurs due to nail penetration can be higher. It is considered that, with such Joule heat, positive electrode current collector 101 is molten in a short period of time and short-circuiting ends in a short period of time. It is thus expected that a total quantity of heat generation by battery 1000 is reduced (that is, increase in temperature of the battery is suppressed).

<<Intermediate Layer>>

As shown in FIG. 1, intermediate layer 10 is arranged between positive electrode composite material layer 102 and positive electrode current collector 101. Intermediate layer 10 may be formed on a surface of positive electrode current collector 101.

Intermediate layer 10 may be formed on both of front and rear surfaces of positive electrode current collector 101.

Intermediate layer 10 contains at least foaming filler 11, resin 12, and conductive material 13. A composition ratio of foaming filler 11, resin 12, and conductive material 13 contained in intermediate layer 10 satisfies conditions (1) and (2) below.

(1) A value calculated by dividing an amount A (mass %) of foaming filler 11 contained in intermediate layer 10 by an amount C (mass %) of resin 12 (which is also simply denoted as "A/C" below) is not smaller than 1.1 and not greater than 2.8.

(2) A value calculated by dividing amount A (mass %) of foaming filler 11 contained in intermediate layer 10 by an amount D (mass %) of conductive material 13 (which is also simply denoted as "A/D" below) is not smaller than 8 and not greater than 14.

It is considered that, when "A/C" is lower than 1.1 in intermediate layer 10, an amount of foaming filler 11 contained in intermediate layer 10 is insufficient with respect to an amount of resin 12. It may thus be difficult to maintain a sufficiently high resistance value of positive electrode 100. Therefore, Joule heat generated in positive electrode 100 at the time of nail penetration is considered as low. It is considered that, since generated Joule heat is low, it requires time for positive electrode current collector 101 to melt and a duration of short-circuiting is longer. It is thus considered that there is a room for improvement in reduction in total quantity of heat generation by battery 1000 (that is, there is a room for improvement in suppression of increase in temperature of the battery).

It is considered that, when "A/C" exceeds 2.8 in intermediate layer 10, an amount of resin 12 contained in intermediate layer 10 is insufficient with respect to an amount of foaming filler 11. Therefore, it is considered that stretchability of intermediate layer 10 is insufficient and intermediate layer 10 insufficiently surrounds nail 700, although the intermediate layer firmly adheres to positive electrode current collector 101. Therefore, it is considered that short-circuiting between positive electrode 100 and negative electrode 200 at a low resistance and direct contact of positive electrode current collector 101 with negative electrode composite material layer 202 cannot sufficiently be prevented and there is a room for improvement in suppression of increase in temperature of the battery at the time of nail penetration.

It is considered that, when "A/D" is lower than 8 in intermediate layer 10, an amount of foaming filler 11 contained in intermediate layer 10 is insufficient with respect to an amount of conductive material 13. It may thus be difficult to maintain a sufficiently high resistance value of positive electrode 100. Therefore, Joule heat generated in positive electrode 100 at the time of nail penetration is considered as low. It is considered that, since generated Joule heat is low, it requires time for positive electrode current collector 101 to melt and a duration of short-circuiting is longer. It is thus considered that there is a room for improvement in reduction in total quantity of heat generation by battery 1000 (that is, there is a room for improvement in suppression of increase in temperature of the battery).

It is considered that, when "A/D" exceeds 14 in intermediate layer 10, an amount of conductive material 13 contained in intermediate layer 10 is insufficient with respect to an amount of foaming filler 11. Therefore, a resistance of the battery can increase.

On the premise that "A/C" and "A/D" are satisfied, intermediate layer 10 may contain, for example, at least 40 mass % and at most 70 mass % of foaming filler 11, at least 25 mass % and at most 45 mass % of resin 12, and at most 10 mass % (in some embodiments, at least 1 mass % and at most 5 mass %) of conductive material 13.

In some embodiments, the intermediate layer 10 has a thickness not smaller than 2 jam and not greater than 7 µm and in some other embodiments not smaller than 2 µm and not greater than 6 µm. It may be difficult to maintain a sufficiently high resistance value of positive electrode 100 when intermediate layer 10 has a thickness smaller than 2 µm. It is thus considered that there is a room for improvement in suppression of increase in temperature of the battery at the time of nail penetration. When intermediate layer 10 has a thickness exceeding 7 µm, a resistance of the battery can increase. It is expected that increase in resistance of the battery can also be suppressed when intermediate layer 10 has a thickness not greater than 6 µm.

A "thickness of a layer" herein can be measured in an electron micrograph (SEM) image of a cross-section in a direction of thickness of a layer. A cross-sectional sample for SEM imaging may be subjected, for example, to focused ion beam (FIB) processing. A thickness of a layer can be measured at at least three locations. An arithmetic mean of thicknesses at the at least three locations can be defined as a thickness of the layer. Measurement sites are located desirably at regular intervals. The measurement sites are desirably distant from each other by at least 10 mm.

Intermediate layer 10 may have stretch at break, for example, not lower than 400% or not lower than 405%. By setting stretch at break of intermediate layer 10 to such a value, it is expected that nail 700 is surrounded by intermediate layer 10 at the time of nail penetration as shown in FIG. 2. Stretch at break represents to which extent a sample (intermediate layer 10) can stretch without breaking. Stretch at break of intermediate layer 10 can be measured, for example, with a measurement method which will be described later.

(Foaming Filler)

Foaming filler 11 foams, for example, at the time of nail penetration and emits inert gas (for example, diphosphorus pentoxide). It is considered that such gas is taken into resin layer 12 and contributes to improvement in stretchability of resin 12. It is considered that foaming filler 11 remains in intermediate layer 10 as an inorganic filler also after foaming and contributes to insulation of positive electrode 100. Namely, it is considered that foaming filler 11 maintains a sufficient high resistance value of positive electrode 100 and contributes to suppression of increase in temperature of the battery at the time of nail penetration.

Desirably, a decomposition start temperature of foaming filler 11 is not lower than 280° C. and a decomposition end temperature thereof is not lower than 800° C. When the decomposition temperature of the foaming filler is lower than 280° C., stretchability of resin 12 may be poor, a short-circuiting resistance may lower, and a temperature of the battery at the time of nail penetration can be high. When the decomposition end temperature of the foaming filler is lower than 800° C., foaming filler 11 is totally decomposed due to increase in temperature of the battery at the time of nail penetration. When gas is suddenly generated, stretchability of the resin may be insufficient, the resin may not remain as an inorganic filler after foaming, and melting may be less likely to occur.

Desirably, a decomposition start temperature of foaming filler 11 is not lower than 280° C. and a decomposition end temperature thereof is not lower than 800° C. as described above. Foaming filler 11 is desirably at least one selected from the group consisting of aluminum phosphate (a decomposition start temperature of 380° C. and a decomposition end temperature >800° C.), ammonium polyphosphate (a decomposition start temperature of 280° C. and a decomposition end temperature >800° C.), and melamine polyphosphate (a decomposition start temperature of 350° C. and a decomposition end temperature >800° C.). Such a foaming filler alone may be used, or two or more types of foaming fillers as being combined may be used. For example, aluminum phosphate emits diphosphorus pentoxide when it reaches the decomposition start temperature. Emitted diphosphorus pentoxide is considered to be taken into resin 12 and improve stretchability of resin 12. In addition, aluminum phosphate is expected to remain in intermediate layer 10 as aluminum oxide (inorganic filler) after it emits diphosphorus pentoxide and to contribute to insulation of positive electrode 100.

Foaming filler 11 may have d90, for example, not greater than 1 µm and d50 not greater than 0.5 µm. "d90" and "d50" herein can be measured with a laser diffraction/scattering method. d90 refers to a particle size at which a cumulative volume of particles from a finer side attains to 90% of the total volume of particles in a volume-based particle size distribution. d50 refers to a particle size at which a cumulative volume of particles from a finer side attains to 50% of the total volume of particles in a volume-based particle size distribution.

(Resin)

Intermediate layer 10 contains resin 12. Resin 12 can function as a binder which binds foaming filler 11 and conductive material 13 and adheres to current collector 101. Resin 12 is desirably at least one selected from the group consisting of polyamide-imide, polytetrafluoroethylene (PTFE), and polyamide. Such a resin (binder) alone may be used, or two or more types of resins (binders) as being combined may be used. Resin 12 may have a melting point, for example, not lower than 200° C. and not lower than 275° C. A resin other than the above may be used so long as resin 12 has a melting point, for example, not lower than 200° C., and a binder used for positive electrode composite material layer 102 such as polyvinylidene difluoride (PVdF) may be used.

(Conductive Material)

Intermediate layer 10 contains conductive material 13. Conductive material 13 may be, for example, acetylene black (AB), furness black, vapor-grown carbon fiber (VGCF), or graphite. Such a conductive material alone may be used, or two or more types of conductive materials as being combined may be used.

(Other Components)

Intermediate layer 10 may further contain at least one filler selected from the group consisting of alumina, boehmite, titania, lithium titanate, and lithium nickel cobalt manganese oxide (NCM). Such a filler alone may be used, or two or more types of fillers as being combined may be used.

(Positive Electrode Composite Material Layer)

Positive electrode composite material layer 102 is formed on a surface of intermediate layer 10. Positive electrode composite material layer 102 may have a thickness, for example, not smaller than 10 µm and not greater than 200 µm. Positive electrode composite material layer 102 contains at least positive electrode active material particles. Positive electrode composite material layer 102 may contain, for example, at least 80 mass % and at most 98 mass % of positive electrode active material particles, at least 1 mass % and at most 10 mass % of conductive particles, and at least 1 mass % and at most 10 mass % of binder. The positive electrode active material particles may have d50, for example, not smaller than 1 µm and not greater than 30 µm.

Positive electrode active material particles electrochemically occlude and release charge carriers (lithium ions in the present embodiment). The positive electrode active material particles should not particularly be limited. The positive electrode active material particles may be, for example, $LiCoO_2$, $LiNiO_2$, $LiMnO_2$, $LiMn_2O_4$, $LiNi_{1/3}Co_{1/3}Mn_{1/3}O_2$, $LiNi_{0.8}Co_{0.15}Mn_{0.05}O_2$, or $LiFePO_4$. One type of positive electrode active material particles alone may be used. Two or more types of positive electrode active material particles as being combined may be used. The conductive particles should not particularly be limited. The conductive particles may be, for example, AB. The binder should not particularly be limited either. The binder may be, for example, polyvinylidene difluoride (PVdF).

(Positive Electrode Current Collector)

Positive electrode current collector 101 is a conductive electrode base material.

Positive electrode current collector 101 may have a thickness, for example, not smaller than 5 µm and not greater than 50 µm. Positive electrode current collector 101 may be made, for example, of a pure Al foil or an Al alloy foil.

<<Negative Electrode>>

Figure 6:
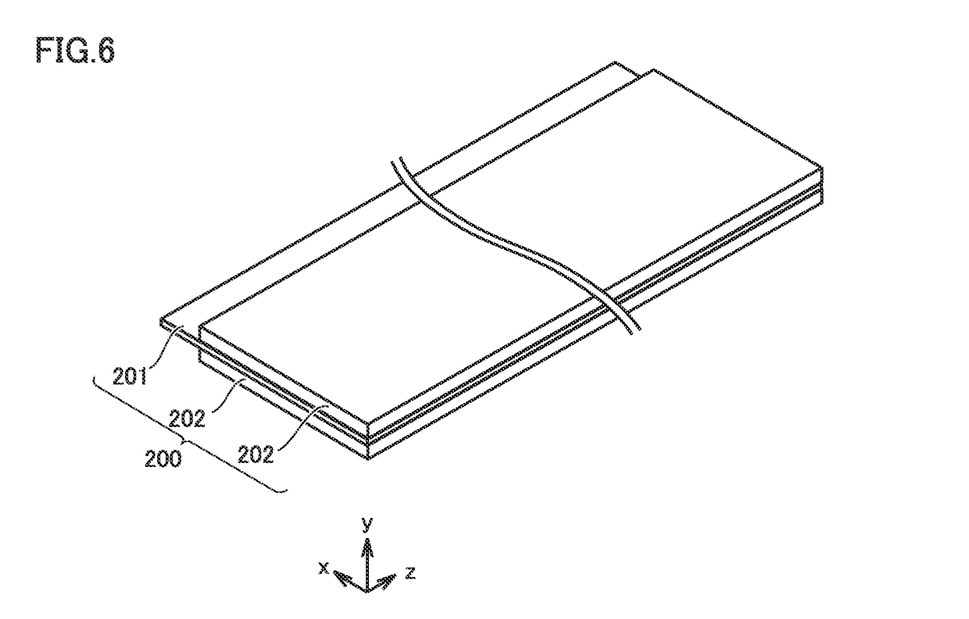
FIG. 6 is a schematic diagram showing one example of a construction of a negative electrode in the present embodiment.

FIG. 6 is a schematic diagram showing one example of a construction of the negative electrode in the present embodiment. Battery 1000 includes at least negative electrode 200 (electrode). Negative electrode 200 is a sheet in a form of a band. Negative electrode 200 includes negative electrode composite material layer 202 (electrode composite material layer) and negative electrode current collector 201 (electrode current collector). Intermediate layer 10 described previously may further be arranged between negative electrode composite material layer 202 and negative electrode current collector 201. Namely, in the present embodiment, at least one of positive electrode 100 and negative electrode 200 includes intermediate layer 10.

(Negative Electrode Composite Material Layer)

Negative electrode composite material layer 202 is formed on a surface of negative electrode current collector 201. Negative electrode composite material layer 202 may be formed on both of front and rear surfaces of negative electrode current collector 201. Negative electrode composite material layer 202 may have a thickness, for example, not smaller than 100 µm and not greater than 200 µm. Negative electrode composite material layer 202 contains at least negative electrode active material particles. Negative electrode composite material layer 202 may contain, for example, at least 90 mass % and at most 99 mass % of negative electrode active material particles and at least 1 mass % and at most 10 mass % of binder.

The negative electrode active material particles may have d50, for example, not smaller than 1 µm and not greater than 30 µm. The negative electrode active material particles electrochemically occlude and release charge carriers. The negative electrode active material particles should not particularly be limited. The negative electrode active material particles may be, for example, artificial graphite, natural graphite, soft carbon, hard carbon, silicon, silicon oxide, a silicon-based alloy, tin, tin oxide, a tin-based alloy, or $Li_4Ti_5O_2$. One type of negative electrode active material particles alone may be used. Two or more types of negative electrode active material particles as being combined may be used. The binder should not particularly be limited either. The binder may be, for example, carboxymethyl cellulose (CMC) and styrene-butadiene rubber (SBR).

(Negative Electrode Current Collector)

Negative electrode current collector 201 is a conductive electrode base material.

Negative electrode current collector 201 may have a thickness, for example, not smaller than 5 µm and not greater than 50 µm. Negative electrode current collector 201 may be made, for example, of a pure copper (Cu) foil or a Cu alloy foil.

<<Separator>>

Battery 1000 can include separator 300. Separator 300 is a film in a form of a band. Separator 300 is arranged between positive electrode 100 and negative electrode 200. Separator 300 may have a thickness, for example, not smaller than 5 µm and not greater than 30 µm. Separator 300 is porous. Separator 300 electrically isolate positive electrode 100 and negative electrode 200 from each other. Separator 300 may be made, for example, of a porous film composed of PE or PP.

Separator 300 may have, for example, a single-layered structure. For example, separator 300 may be formed only of a porous film composed of PE. Separator 300 may have, for example, a multi-layered structure. Separator 300 may be formed, for example, by stacking a porous film composed of PP, a porous film composed of PE, and a porous film composed of PP in this order. Separator 300 may include a heat-resistant layer on a surface thereof. The heat-resistant layer contains a heat-resistant material. The heat-resistant material may be, for example, alumina or polyimide.

<<Electrolyte Solution>>

Battery 1000 can contain an electrolyte solution. The electrolyte solution contains at least lithium (Li) salt and a solvent. The electrolyte solution may contain, for example, at least 0.5 mol/l and at most 2 mol/l of Li salt. The Li salt is a supporting electrolyte. The Li salt is dissolved in the solvent. The Li salt may be, for example, $LiPF_6$, $LiBF_4$, $Li[N(FSO_2)_2]$, or $Li[N(CF_3SO_2)_2]$. One type of Li salt alone may be used. Two or more types of Li salt as being combined may be used.

The solvent is aprotic. Namely, the electrolyte solution in the present embodiment is a non-aqueous electrolyte. The solvent may be, for example, a mixture of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the Li salt and the solvent. The electrolyte solution may contain, for example, at least 1 mass % and at most 5 mass % of functional additive. Examples of the functional additive include a gas generating agent (an overcharge additive) and a solid electrolyte interface (SEI) film forming agent. The gas generating agent may be, for example, cyclohexylbenzene (CHB) or biphenyl (BP). The SEI film forming agent may be, for example, vinylene carbonate (VC), vinyl ethylene carbonate (VEC), $Li[B(C_2O_4)_2]$, $LiPO_2F_2$, propane sultone (PS), or ethylene sulfite (ES).

Battery 1000 in the present embodiment may contain a gel electrolyte and a solid electrolyte instead of the electrolyte solution (a liquid electrolyte). Battery 1000 may further contain a gel electrolyte and a solid electrolyte in addition to the electrolyte solution.

<Application>

Battery 1000 in the present embodiment is expected to achieve suppression of increase in temperature of the battery at the time of nail penetration. Applications in which such characteristics are made use of include, for example, a power supply for driving for a hybrid vehicle (HV), a plug-in hybrid vehicle (PHV), an electric vehicle (EV), and the like. Applications of battery 1000 in the present embodiment should not be limited to car-mounted applications. Battery 1000 in the present embodiment can be applied to each and every application.

EXAMPLES

Examples of the present disclosure will be described below. The description below does not limit the scope of claims.

Example 1

1. Formation of Intermediate Layer
Materials below were prepared.
Foaming filler: aluminum phosphate
Resin: polyamide-imide
Conductive material: AB
Solvent: N-methyl-2-pyrrolidone (NMP)
Positive electrode current collector: Al foil Slurry was prepared by mixing aluminum phosphate, polyamide-imide, AB, and NMP in a planetary mixer. A ratio of mixing was set to "aluminum phosphate:polyamide-imide:AB=70:25:5" at a mass ratio. The slurry was applied to surfaces (both of front and rear surfaces) of positive electrode current collector 101 and dried. Intermediate layer 10 was formed by thereafter subjecting the slurry to heat treatment for six hours at 360° C. in nitrogen. Intermediate layer 10 (dried, on one surface) had a thickness of 3 μm.

2. Formation of Positive Electrode Composite Material Layer
Materials below were prepared.
Positive electrode active material: $LiNi_{0.8}Co_{0.15}Mn_{0.05}O_2$ (NCA)
Conductive material: AB
Binder: PVdF
Solvent: NMP
Positive electrode current collector: Al foil having intermediate layer 10 formed NCA, AB, PVdF, and NMP were mixed in a planetary mixer. Slurry for the positive electrode composite material layer was thus prepared. A solid composition of the slurry for the positive electrode composite material layer was set to "NCA:AB:PVdF=88:10:2" at a mass ratio. The slurry for the positive electrode composite material layer was applied to a surface of intermediate layer 10 with a comma coater (trademark) and dried. Positive electrode composite material layer 102 was thus formed. Positive electrode composite material layer 102 was rolled to have a density of 3.7/cm³. Positive electrode 100 was manufactured as set forth above.

3. Preparation of Negative Electrode
Materials below were prepared.
Negative electrode active material particles: graphite (particle size (d50): 25 μm)
Binder: SBR and CMC
Solvent: water
Negative electrode current collector: Cu foil The negative electrode active material, the binder, and the solvent were mixed in a planetary mixer. Slurry for the negative electrode composite material layer was thus prepared. A solid composition of the slurry for the negative electrode composite material layer was set to "negative electrode active material:SBR:CMC=98:1:1" at a mass ratio. Negative electrode composite material layer 202 was formed by applying the slurry to surfaces (both of front and rear surfaces) of negative electrode current collector 201 and drying the slurry. Negative electrode composite material layer 202 was rolled to have a prescribed density. Negative electrode 200 was manufactured as set forth above.

4. Assembly

Separator 300 in a form of a band was prepared. Separator 300 had a thickness of 25 μm. Separator 300 had a three-layered structure. Namely, separator 300 was formed by stacking a porous film composed of PP, a porous film composed of PE, and a porous film composed of PP in this order.

Electrode group 500 was manufactured by stacking positive electrode 100, separator 300, negative electrode 200, and separator 300 in this order and further spirally winding the same. A cylindrical housing was prepared. The housing had a 18650 size (having a diameter=18 mm and a height=65 mm). Electrode group 500 was accommodated in housing 1001.

An electrolyte solution composed as below was prepared.
Solvent: [EC:DMC:EMC=3:4:3 (at a volume ratio)]
Supporting electrolyte: $LiPF_6$ (1 mol/l)

The electrolyte solution was introduced into housing 1001. Housing 1001 was hermetically sealed. A non-aqueous electrolyte secondary battery according to Example 1 was manufactured as set forth above. The non-aqueous electrolyte secondary battery had a rated capacity of 1 Ah.

Examples 2 and 3 and Comparative Examples 2 and 4

Battery 1000 was manufactured as in Example 1 except for change in composition ratio of each component in intermediate layer 10 as shown in Table 1 below.

Examples 4 and 5

Battery 1000 was manufactured as in Example 1 except for change in type of resin 12 contained in intermediate layer 10 as shown in Table 1 below.

Examples 6 to 9 and Comparative Example 3

Battery 1000 was manufactured as in Example 1 except for change in thickness of intermediate layer 10 as shown in Table 1 below.

Examples 10 and 11

Battery 1000 was manufactured as in Example 1 except for change in type of foaming filler 11 contained in intermediate layer 10 as shown in Table 1 below.

Example 12

Battery 1000 was manufactured as in Example 1 except for further addition of a filler to intermediate layer 10 and change in composition ratio of each component in intermediate layer 10 as shown in Table 1 below.

Examples 13 to 19

Battery 1000 was manufactured as in Example 1 except for change in type of foaming filler 11 contained in intermediate layer 10, further addition of a filler to intermediate layer 10, and change in composition ratio of each component in intermediate layer 10 as shown in Table 1 below.

Comparative Example 1

Battery 1000 was manufactured as in Example 1 except for addition of alumina without addition of foaming filler 11 to intermediate layer 11 and change in composition ratio of each component in intermediate layer 10 as shown in Table 1 below.

Comparative Example 5

Battery 1000 was manufactured as in Example 1 except for change in type of foaming filler 11 contained in intermediate layer 10, further addition of a filler to intermediate layer 10, change in composition ratio of each component in intermediate layer 10, and change in thickness of intermediate layer 10 as shown in Table 1 below.

<Evaluation>
<<Resistance of Battery>>

An SOC of battery 1000 was adjusted to 50%. In an environment at 25° C., battery 1000 was discharged for ten seconds at a current rate of 10 C. An amount of lowering in voltage ten seconds after start of discharging was measured. A resistance of the battery was calculated based on relation between an amount of lowering in voltage and a current rate. Results are shown in the field of "resistance of battery" in Table 2 below. It is considered that, as the resistance of the battery is lower, a resistance of the battery during normal use is lower.

<<Nail Penetration Test>>

The battery was fully charged with constant current-constant voltage charging (a current in constant current charging=1 A, a voltage in constant voltage charging=4.2 V, and a cutoff current=50 mA). A thermocouple was attached to the battery. A nail having a diameter in a body portion of 3 mm was prepared. The nail was driven into a side surface of the battery at a rate of 120 mm/second in an environment at 25° C. A highest reached temperature after the nail was driven was measured. Results are shown in the field of "reached temperature" in Table 2 below. A lower reached temperature indicates further suppression of increase in temperature of the battery at the time of nail penetration.

<<Intermediate Layer Tensile Elongation Test>>

Intermediate layer 10 was fabricated on a glass plate with the method described previously. With such intermediate layer 10, elongation of intermediate layer 10 immediately before breaking was measured with reference to an S-S curve at a test rate of 10 mm/min. based on ASTM D638 (with the use of Precision Universal Tester AG20 manufactured by Shimadzu Corporation). Tensile elongation of intermediate layer 10 was measured by dividing elongation immediately before breaking by a length of intermediate layer 10 before the test. Five test pieces were subjected to measurement and an arithmetic mean of stretch at break was adopted as the result of measurement. The results are shown in the field of "intermediate layer tensile elongation" in Table 2. A greater value indicates better stretchability.

<<Positive Electrode Resistance Measurement Test>>

Two positive electrodes 100 cut into a size of 20×20 mm were layered on each other, a current of 10 mA was fed between two positive electrodes 100 while a pressure (50 kg/cm$^2$) was applied, and a voltage at that time was measured. Such a voltage value and a value of a voltage across two positive electrodes 100 were measured, and a direct-current resistance of positive electrode 100 was found with a four-terminal method. Results are shown in the field of "resistance of positive electrode" in Table 2. A smaller value indicates a lower resistance of the positive electrode.

TABLE 1

| | Foaming Filler (A) | Filler (B) | Resin Material (C) | Conductive Material (D) | Blending Ratio A:B:C:D (Mass %) | A/C | A/D | C/D | Thickness on One Surface μm |
|---|---|---|---|---|---|---|---|---|---|
| Example 1 | Aluminum Phosphate | — | Polyamide-imide | AB | 70:0:25:5 | 2.8 | 14 | 5 | 3 |
| Example 2 | Aluminum Phosphate | — | Polyamide-imide | AB | 60:0:35:5 | 1.7 | 12 | 7 | 3 |
| Example 3 | Aluminum Phosphate | — | Polyamide-imide | AB | 50:0:45:5 | 1.1 | 10 | 9 | 3 |
| Example 4 | Aluminum Phosphate | — | PTFE | AB | 70:0:25:5 | 2.8 | 14 | 5 | 3 |
| Example 5 | Aluminum Phosphate | — | Polyamide | AB | 70:0:25:5 | 2.8 | 14 | 5 | 3 |
| Example 6 | Aluminum Phosphate | — | Polyamide-imide | AB | 70:0:25:5 | 2.8 | 14 | 5 | 2 |
| Example 7 | Aluminum Phosphate | — | Polyamide-imide | AB | 70:0:25:5 | 2.8 | 14 | 5 | 4 |
| Example 8 | Aluminum Phosphate | — | Polyamide-imide | AB | 70:0:25:5 | 2.8 | 14 | 5 | 6 |
| Example 9 | Aluminum Phosphate | — | Polyamide-imide | AB | 70:0:25:5 | 2.8 | 14 | 5 | 7 |
| Example 10 | Melamine Polyphosphate | — | Polyamide-imide | AB | 70:0:25:5 | 2.8 | 14 | 5 | 3 |
| Example 11 | Ammonium Polyphosphate | — | Polyamide-imide | AB | 70:0:25:5 | 2.8 | 14 | 5 | 3 |
| Example 12 | Aluminum Phosphate | Alumina | Polyamide-imide | AB | 60:10:25:5 | 2.4 | 12 | 5 | 3 |
| Example 13 | Melamine Polyphosphate | Alumina | Polyamide-imide | AB | 60:10:25:5 | 2.4 | 12 | 5 | 3 |

TABLE 1-continued

| | Foaming Filler (A) | Filler (B) | Resin Material (C) | Conductive Material (D) | Blending Ratio A:B:C:D (Mass %) | A/C | A/D | C/D | Thickness on One Surface μm |
|---|---|---|---|---|---|---|---|---|---|
| Example 14 | Ammonium Polyphosphate | Alumina | Polyamide-imide | AB | 60:10:25:5 | 2.4 | 12 | 5 | 3 |
| Example 15 | Melamine Polyphosphate | Alumina | Polyamide-imide | AB | 40:30:25:5 | 1.6 | 8 | 5 | 3 |
| Example 16 | Melamine Polyphosphate | Boehmite | Polyamide-imide | AB | 40:30:25:5 | 1.6 | 8 | 5 | 3 |
| Example 17 | Melamine Polyphosphate | Titania | Polyamide-imide | AB | 40:30:25:5 | 1.6 | 8 | 5 | 3 |
| Example 18 | Melamine Polyphosphate | Lithium Titanate | Polyamide-imide | AB | 40:30:25:5 | 1.6 | 8 | 5 | 3 |
| Example 19 | Melamine Polyphosphate | NCM | Polyamide-imide | AB | 40:30:25:5 | 1.6 | 8 | 5 | 3 |
| Comparative Example 1 | — | Alumina | Polyamide-imide | AB | 0:70:25:5 | 0 | 0 | 5 | 3 |
| Comparative Example 2 | Aluminum Phosphate | — | Polyamide-imide | AB | 80:0:15:5 | 5.3 | 16 | 3 | 3 |
| Comparative Example 3 | Aluminum Phosphate | — | Polyamide-imide | AB | 70:0:25:5 | 2.8 | 14 | 5 | 1.5 |
| Comparative Example 4 | Aluminum Phosphate | — | Polyamide-imide | AB | 65:0:25:10 | 2.6 | 6.5 | 2.5 | 3 |
| Comparative Example 5 | Melamine Polyphosphate | Alumina | Polyamide-imide | AB | 40:30:25:10 | 1.6 | 4 | 2.5 | 6 |

TABLE 2

| Our Proposal | Electrode Characteristics | | | Nail Penetration Test Reached Temperature (° C.) |
|---|---|---|---|---|
| | Intermediate Layer Tensile Elongation (%) | Resistance of Positive Electrode [Ω·cm] | Battery Characteristics Resistance of Battery [mΩ] | |
| Example 1 | 405 | 215 | 24.4 | 89 |
| Example 2 | 420 | 221 | 23.4 | 83 |
| Example 3 | 455 | 224 | 23.2 | 81 |
| Example 4 | 402 | 213 | 23.1 | 94 |
| Example 5 | 414 | 214 | 26.3 | 98 |
| Example 6 | 431 | 232 | 24.2 | 88 |
| Example 7 | 435 | 245 | 24.9 | 84 |
| Example 8 | 442 | 281 | 25.5 | 81 |
| Example 9 | 453 | 327 | 31.1 | 79 |
| Example 10 | 447 | 206 | 23.5 | 95 |
| Example 11 | 438 | 202 | 23.4 | 98 |
| Example 12 | 486 | 214 | 21.8 | 85 |
| Example 13 | 521 | 228 | 22.1 | 85 |
| Example 14 | 494 | 212 | 22.3 | 86 |
| Example 15 | 431 | 223 | 22.5 | 81 |
| Example 16 | 426 | 219 | 22.6 | 87 |
| Example 17 | 405 | 210 | 23.3 | 90 |
| Example 18 | 424 | 208 | 22.7 | 86 |
| Example 19 | 443 | 238 | 21.3 | 89 |
| Comparative Example 1 | 392 | 146 | 22.6 | 103 |
| Comparative Example 2 | 380 | 194 | 24.7 | 112 |
| Comparative Example 3 | 328 | 98 | 22.6 | 143 |
| Comparative Example 4 | 410 | 124 | 21.3 | 147 |
| Comparative Example 5 | 376 | 135 | 21.1 | 104 |

<Results>

As shown in Table 2, Examples 1 to 19 which satisfied all of conditions (1) to (4) below achieved more noticeable suppression of increase in temperature of the battery at the time of nail penetration than Comparative Examples 1 to 5. It is considered that, in Example 1, as shown in FIG. 2, intermediate layer 10 continued to exist around nail 700 while intermediate layer 10 firmly adhered to positive electrode current collector 101 owing to resin 12.

(1) At least the positive electrode composite material layer, the intermediate layer, and the positive electrode current collector are included and the intermediate layer is arranged between the positive electrode composite material layer and the positive electrode current collector.

(2) Intermediate layer 10 contains at least foaming filler 11, resin 12, and conductive material 13.

(3) "A/C" in intermediate layer 10 is not smaller than 1.1 and not greater than 2.8 and "A/D" in intermediate layer 10 is not smaller than 8 and not greater than 14.

(4) Intermediate layer 10 has a thickness not smaller than 2 μm and not greater than 7 μm.

In Comparative Example 1, intermediate layer 10 contained no foaming filler 11. Therefore, positive electrode 100 had a resistance value of 146 Ω·cm. Therefore, it is considered that Joule heat generated in positive electrode 100 on the occurrence of nail penetration was low. It is consequently considered that it required time for positive electrode current collector 101 to melt and a duration of short-circuiting was longer. In addition, it was considered that, in Comparative Example 1, stretchability of resin 12 was not sufficiently improved (tensile elongation of the intermediate layer was 392%), and there was a room for improvement in continued existence of intermediate layer 10 around nail 700 while intermediate layer 10 firmly adhered to positive electrode current collector 101 owing to resin 12 as shown in FIG. 2. It is considered that there is a room for improvement in suppression of increase in temperature of the battery at the time of nail penetration owing to interaction of these phenomena.

In Comparative Example 2, "A/C" was 5.3 which exceeded 2.8. Namely, it is considered that an amount of resin 12 contained in intermediate layer 10 was insufficient with respect to an amount of foaming filler 11. Therefore, tensile elongation of the intermediate layer was 380% and stretchability of intermediate layer 10 was insufficient. It is thus considered that intermediate layer 10 did not sufficiently continue to exist around nail 700. In addition, positive electrode 100 had a resistance value of 194 Ω·cm. Therefore, it is considered that Joule heat generated in positive electrode 100 on the occurrence of nail penetration was low. It is consequently considered that it required time for positive electrode current collector 101 to melt and a duration of short-circuiting was longer. It is considered that there is a room for improvement in suppression of increase in temperature of the battery at the time of nail penetration owing to interaction of these phenomena.

In Comparative Example 3, intermediate layer 10 had a thickness of 1.5 μm which was smaller than 2 μm. Therefore, tensile elongation of the intermediate layer was 328% and stretchability of intermediate layer 10 was insufficient. It is thus considered that intermediate layer 10 did not sufficiently continue to exist around nail 700. In addition, it was difficult to maintain a sufficiently high resistance value of positive electrode 100 and positive electrode 100 had a resistance value of 98 Ω·cm. Therefore, it is considered that Joule heat generated in positive electrode 100 on the occurrence of nail penetration was low. It is consequently considered that it required time for positive electrode current collector 101 to melt and a duration of short-circuiting was longer. It is considered that there is a room for improvement in suppression of increase in temperature of the battery at the time of nail penetration owing to interaction of these phenomena.

In Comparative Example 4, "A/D" was 6.5 which was lower than 8. Namely, it is considered that an amount of foaming filler 11 contained in intermediate layer 10 was insufficient with respect to an amount of conductive material 13. Therefore, positive electrode 100 had a resistance value of 124 Ω·cm. Therefore, it is considered that Joule heat generated in positive electrode 100 on the occurrence of nail penetration was low. It is consequently considered that it required time for positive electrode current collector 101 to melt, a duration of short-circuiting was longer, and there is a room for improvement in suppression of increase in temperature of the battery.

In Comparative Example 5, "A/D" was 4 which was lower than 8. Namely, it is considered that an amount of foaming filler 11 contained in intermediate layer 10 was insufficient with respect to an amount of conductive material 13. Therefore, positive electrode 100 had a resistance value of 135 Ω·cm. Therefore, it is considered that Joule heat generated in positive electrode 100 on the occurrence of nail penetration was low. It is consequently considered that it required time for positive electrode current collector 101 to melt and a duration of short-circuiting was longer. In addition, tensile elongation of the intermediate layer was 376% and stretchability of intermediate layer 10 was insufficient. It is thus considered that intermediate layer 10 did not sufficiently continue to exist around nail 700. It is considered that there is a room for improvement in suppression of increase in temperature of the battery at the time of nail penetration owing to interaction of these phenomena.

It is understood based on comparison between Examples and Comparative Example 1 that suppression of increase in temperature of the battery at the time of nail penetration was noticeably achieved by containing foaming filler 11 of which decomposition start temperature was not lower than 280° C. and decomposition end temperature was not lower than 800° C. in intermediate layer 10.

It is understood based on the results in Examples 1, 10, and 11 that foaming filler 11 is at least one selected from the group consisting of aluminum phosphate, ammonium polyphosphate, and melamine polyphosphate.

It is understood based on the results in Examples 1, 4, and 5 that resin 12 is at least one selected from the group consisting of polyamide-imide, polytetrafluoroethylene, and polyamide.

It is understood based on the results in Examples 12 to 19 that intermediate layer 10 may further contain at least one filler selected from the group consisting of alumina, boehmite, titania, lithium titanate, and lithium nickel cobalt manganese oxide (NCM), in addition to foaming filler 11, resin 12, and conductive material 13. It is understood based on comparison between Examples 1 and 12 that, in addition to suppression of increase in temperature of the battery at the time of nail penetration, increase in resistance of the battery can also be suppressed by further containing such a filler.

It is understood based on comparison between Example 9 and other Examples that, in addition to suppression of increase in temperature of the battery at the time of nail penetration, increase in resistance of the battery can also be suppressed by satisfying the conditions (1) to (4) and setting a thickness of intermediate layer 10 to be not smaller than 2 μm and not greater than 6 μm.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A non-aqueous electrolyte secondary battery comprising at least:

an electrode composite material layer;

an intermediate layer; and an electrode current collector, the intermediate layer being arranged between the electrode composite material layer and the electrode current collector, the intermediate layer containing at least a foaming filler, a resin, and a conductive material, a value calculated by dividing an amount (mass %) of the foaming filler by an amount (mass %) of the resin being not smaller than 1.1 and not greater than 2.8, a value calculated by dividing an amount (mass %) of the foaming filler by an amount (mass %) of the conductive material being not smaller than 8 and not greater than 14, and the intermediate layer having a thickness not smaller than 2 μm and not greater than 7 μm.

2. The non-aqueous electrolyte secondary battery according to claim 1, wherein a decomposition start temperature of the foaming filler is not lower than 280° C. and a decomposition end temperature of the foaming filler is not lower than 800° C.

3. The non-aqueous electrolyte secondary battery according to claim 1, wherein the foaming filler is at least one selected from the group consisting of aluminum phosphate, ammonium polyphosphate, and melamine polyphosphate.

4. The non-aqueous electrolyte secondary battery according to claim 1, wherein the resin is at least one selected from the group consisting of polyamide-imide, polytetrafluoroethylene, and polyamide.

5. The non-aqueous electrolyte secondary battery according to claim 1, wherein the intermediate layer further contains at least one filler selected from the group consisting of alumina, boehmite, titania, lithium titanate, and lithium nickel cobalt manganese oxide (NCM).

6. The non-aqueous electrolyte secondary battery according to claim 1, wherein
the intermediate layer has a thickness not smaller than 2 μm and not greater than 6 μm.

* * * * *

UNITED STATES PATENT AND TRADEMARK OFFICE
CERTIFICATE OF CORRECTION

PATENT NO. : 10,720,673 B2
APPLICATION NO. : 16/167959
DATED : July 21, 2020
INVENTOR(S) : Koji Torita, Keiichi Takahashi and Yusuke Fukumoto It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Nishinomiya" and insert --Nishinomiya-shi Hyogo-ken--, therefor.

Item (72), inventor 3, city, delete "Toyonaka" and insert --Toyonaka-shi Osaka-fu--, therefor.

In the Specification

In Column 7, Line 11, delete "2 jam" and insert --2 µm--, therefor.

Signed and Sealed this
Seventeenth Day of November, 2020

Andrei Iancu
*Director of the United States Patent and Trademark Office*